United States Patent Office 3,803,125
Patented Apr. 9, 1974

3,803,125
PROCESS FOR MAKING NUCLEOSIDE
DIPHOSPHATE COMPOUNDS
Hans Ulrich Bergmeyer, Tutzing, Upper Bavaria, Erich Haid, Weilheim, Michael Nelboeck-Hochstetter, Tutzing, Upper Bavaria, and Gunter Weimann, Percha, Upper Bavaria, Germany, assignors to Boehringer Mannheim GmbH, Mannheim, Germany
No Drawing. Filed Mar. 16, 1971, Ser. No. 124,918
Claims priority, application Germany, Apr. 3, 1970,
P 20 16 049.0
Int. Cl. C07d 51/50
U.S. Cl. 260—211.5 R        17 Claims

ABSTRACT OF THE DISCLOSURE

Nucleoside diphosphate and its esters are prepared in good yield, with short reaction times and without substantial formation of by-products, by reacting (a) a nucleoside monophosphate amidate compound of the formula:

in which X is nucleoside residue, and Am is a radical of the formula:

wherein $R_1$ and $R_2$, which can be the same or different, are hydrogen atoms or alkyl radicals containing up to 4 carbon atoms or wherein $R_1$ and $R_2$, together with the nitrogen atom to which they are attached, form a heterocyclic ring, which can contain a further heteroatom;

(b) a phosphoric acid compound of the formula:

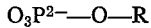

in which R is hydrogen atom or the residue of a hydroxyl group-containing organic compound;

in an aliphatic alcohol of from 1 to 4 carbon atoms or in a dialkyl ketone of from 1 to 3 carbon atoms per alkyl group or in dimethyl formamide, at a pH of from about 1 to 6.5.

---

The present invention is concerned with a process for the preparation of nucleoside diphosphates and of their esters.

It is already known to prepare nucleoside diphosphate esters by the reaction of the nucleoside phosphate with dicyclohexyl carbodiimide in the presence of a phosphoric acid ester. This process suffers from the disadvantage that it requires a period of reaction of seven days, gives numerous by-products and only provides unsatisfactory yields of up to about 45%. According to another suggestion of the art, a a nucleoside-5′-phosphoramide is reacted with dicyclohexyl carbodiimide to give the corresponding dihexyl guanidinium salt and the latter is condensed with a phosphoric acid ester by heating for 16 hours in o-chlorophenol at 100° C. In the case of this process, the period of reaction is shortened but the yields and purity are just as unsatisfactory as in the case of the first-mentioned prior art process.

In addition to these chemical processes, there are also already been described the enzymatic preparation of the corresponding nucleoside triphosphates with phosphoric acid esters in the presence of appropriate enzymes. However, this process is unsuitable for a economically feasible preparation of the desired products.

The present invention provides a process for the chemical preparation of nucleoside diphosphates and of nucleoside diphosphate esters, which does not suffer from the above-mentioned disadvantages and gives good yields of the desired compounds in a short period of time, without formation of substantial amounts of disturbing by-products.

Essentially, the process according to the present invention comprises the preparation of nucleoside diphosphates and of their esters, wherein a nucleoside monophosphate amidate compound of the general formula:

in which X is a nucleoside residue and Am is a radical of the formula

wherein $R_1$ and $R_2$, which can be the same or different, are hydrogen atoms or alkyl radicals containing up to 4 carbon atoms or wherein $R_1$ and $R_2$, together with the nitrogen atom to which they are attached, form a heterocyclic ring, which can contain a further heteroatom; is reacted with a phosphoric acid compound of the general formula:

in which R is a hydrogen atom or the residue of a hydroxyl group-containing organic compound, the reaction being carried out in an aliphatic alcohol containing up to 4 carbon atoms or in a dialkyl ketone containing up to 3 carbon atoms in each alkyl radical or in dimethyl formamide or in a mixture thereof with water at a pH value between 1 and 6.5, preferably 4 to 5. The reaction is preferably carried out at ambient temperature and gives, within a period of about 1 to 24 hours, yields of up to 90% or more.

It is especially surprising that, under the conditions of the process according to the present invention, the nucleoside-5-phosphate esters are not formed with the solvent or only in very small amounts since J. Moffat and H. G. Khorana (J.A.C.S., 83 649/1961) have described, under quite similar conditions, the practically quantitative formation of the corresponding methyl esters in the presence of methanol. It is also surprising that, besides the absence of the ester formation to be expected with the solvent, hardly any dinucleoside pyrophosphates are formed.

The starting compounds of the General Formula I, some of which are known, can be readily obtained by known processes.

The nucleoside residue in the compounds of General Formula I can be derived from a naturally-occurring or synthetic nucleoside. Examples of natural nucleosides include cytidine, uridine, thymidine, 5-methyl-cytidine, 5-hydroxymethyl-cytidine, pseudo-uridine, adenosine, guanosine and inosine, as well as the corresponding 2′-desoxy compounds. Most of the synthetic nucleosides which can be used are derived from the above-mentioned natural nucleosides.

According to the process of the present invention, the nucleosides are used in the form of amidates: besides the amide group itself, there can, in particular, be used the mono- and dialkyl-substituted amidates, for example, dimethyl-amidate, mono- and diethyl-amidate, mono- and dipropyl-amidate, the isopropyl-amidates and the butyl-amidates, as well as the mixed amidates. Especially interesting are those amidates, the alkyl radicals of which are joined together to form a ring, for example, the morpholidates, piperidates, cyclohexylamidates and anilidates.

The morpholidates are especially preferably used, for example, cytidine-5′-phosphoric acid morpholidate, adenosine-5'-phosphoric acid morpholidate and uridine-5'-phosphoric acid morpholidate.

In the process according to the present invention, the second component is phosphoric acid or a phosphoric acid ester. When using phosphoric acid, the process according to the present invention gives the corresponding nucleoside diphosphates.

The process according to the present invention is of especial importance for the preparation of nucleoside diphosphoric acid esters by the reaction of the compounds of General Formula I with an appropriate phosphoric acid ester. The phosphoric acid can thus be used with any appropriate hydroxyl group-containing organic compound, provided that the resulting phosphoric acid ester is sufficiently soluble in the solvent system used according to the present invention. Examples of hydroxyl group-containing organic compounds, which can be used in the form of their phosphoric acid esters, include mono- and polyhydroxy alcohols and amino alcohols, such as ethanolamine and choline, hydroxyl group-containing amino acids, such as serine, and sugars, such as glucose, mannose, galactose, ribose and glyceraldehyde, as well as the related ketoses and aminosugars. Examples of the compounds of General Formula II include, therefore, choline phosphate, ethanolamine phosphoric acid, serine phosphate, glucose-6-phosphate, galactose-1-phosphate and mannose-1-phosphate.

Methanol is preferably used as solvent. However, the other above-mentioned alcohols, as well as dimethyl formamide, can also be used, as well as the above-mentioned dialkyl ketones. These solvents can be used alone or in admixture with one another. Methanol has proved to be especially suitable, isopropanol being added thereto in the course of the reaction in order to promote precipitation of the product formed. Dimethyl formamide, which is also very well suited for the reaction, necessitates, however, a somewhat more laborious working up of the reaction mixture.

An important advantage of the process according to the present invention is that it is not necessary to work under anhydrous conditions. Generally, a certain content of water can be tolerated and, in some cases, is useful as a solubilizer because some starting materials do not dissolve or only dissolve slightly in the organic solvents which can be used, such as pure methanol. On the other hand, the addition of water reduces the yield somewhat. The amount of the water content used itself plays no part and very good yields were obtained even when the water content was as much as 40%.

As acid for the adjustment of the pH value of the reaction mixture in the necessary range between 1 and 6.5, there can, in principle, be used not only inorganic acids but also organic acids which are soluble in the solvent system used. The hydrohalic acids, especially hydrochloric acid, are preferred. As a result of the water tolerance of the process according to the present invention, the acids, especially the hydrohalic acids, can be used in an aqueous form, for example, concentrated hydrochloric acid. All acids can be used which do not lead to precipitation of a reaction component or react irreversibly therewith, for example, perchloric acid, sulfuric acid and nitric acid.

The reaction components used in the process according to the present invention can be employed in the form of their salts, especially the alkali metal and alkaline earth metal salts, the calcium salts having proved to be especially useful. It is assumed that the calcium ions exert a solubilizing action. However, sodium, potassium, lithium, strontium, magnesium and barium salts, as well as some salts with organic amines, for example of the sugar phosphates or aminoalcohol phosphates, have also proved to be useful. However, we have found that when using the sodium, potassium and barium salts, because of their lower solubility, the water content of the reaction medium is expediently increased. The calcium salts can also be used in the form of mixed salts, for example, as mixed salts with hydrohalic acids, such as choline phosphate calcium chloride. This is an especial advantage of the process according to the present invention because many of the reagents used are commercially available in the form of their calcium salts and some of them in the form of their calcium chloride salts and, in this form, can be used directly without previous drying or the like.

As already mentioned above, the reaction according to the present invention takes place in an acidic medium, the best results being achieved at pH values between 4 and 5. However, depending upon the starting materials used, lower pH values can also be of advantage. Nevertheless, below pH 4, the tendency for the formation of esterification products with the solvent increases, for example, of the methyl esters when using methanol.

The reaction temperature is not critical and the reaction can be carried out at a temperature between 0 and 60° C., ambient temperature being preferred.

The purification and working up of the products obtained is simple because they are already obtained in a comparatively pure form and, in general, only contain traces of impurities. In many cases, the product even crystallizes out directly in the course of the reaction, for example, in the form of the calcium salt. Precipitation of the product can be promoted by the addition of a further solvent, for example, isopropanol, for reducing the solubility of the product. Furthermore, precipitation of the reaction product in the course of the reaction displaces the equilibrium in favor of the desired end product, this contributing to the very good yields which can be achieved by the process according to the present invention.

Besides the already-mentioned good yields and the substantially shortened reaction period, as well as the simple purification and obtaining of the products, further advantages of the process according to the present invention reside in the use of simple and cheap solvents, as well as the possibility of working in the presence of water. Therefore, the process according to the present invention can be carried out, even on a large scale, in simple apparatus and the otherwise usual great expenditure of time for the removal of water from the reaction medium by means of azeotropic distillation, treatment with molecular sieves of the like, is unnecessary. Reference has also already been made to the advantage that most of the starting materials can be used in the form of commercially available salts which do not have to be first converted into the free phosphoric acids. Therefore, overall, the process of the present invention provides an important technical advance.

The products obtainable by the process according to the present invention are physiologically interesting and are of use not only as pharmaceuticals but also in research. Many of the compounds play a very large part in the physiological cellular processes, for example, in the biosynthesis of phosphatides, of cell wall structures and the like. For example, the biosynthesis of phosphatides of bases, such as lecithin, cephalin and sphingomyelin, takes place by activation of the base and in the case of the other compounds with less basic residues, such as serine, inositol and cardiolipin, by activation of the diglyceride. The activation thereby consists, in all cases, in the formation of the corresponding cytidine diphosphate (CPD) compound which can then further transmit the activated residue. In the case of a number of diseases with phosphatide participation, the phospholipids occur in reduced amounts, for example, in the case of the "glycolipid diseases," sphingolipidosis (Niemann-Pick disease) and others. Cytidine diphosphate choline, obtainable by the process according to the present invention in substantially improved yield and purity, was successfully administered, for example, in cases of brain damage as a lecithin precursor and led to remarkable improvement of the clinical symptoms. By means of treatment with this substance, the survival rate in the case of brain damage could be considerably increased.

The following examples are given for the purpose of illustrating the present invention.

EXAMPLE 1

Cytidine diphosphate choline 81 g. chlodine phosphate calcium chloride tetrahydrate were dissolved in 1 liter hot methanol and acidified with concentrated hydrochloric acid to pH 3.5. A solution of 47 to 48 g. cytidine-5'-phosphoric acid morpholidate in 600 ml. methanol was added to the choline phosphate solution.

The initially clear solution became cloudy and, after a short time, a considerable precipitation occurred. After a further 24 hours, 1.6 liters isopropanol were added and the percipitate was filtered off, dissolved in water, neutralized and chromatographed through a column containing 2.0 liters of an anion exchanger (Dowex 1×2 in formate form; 50–100 mesh). After washing with water, the cytidine diphosphate choline formed was eluted with 0.02 M formic acid. The fractions containing the cytidine diphosphate choline were concentrated, neutralized with an aqueous solution of sodium hydroxide and crystallized by the addition of ethanol. The sodium cytidine diphosphate choline tetrahydrate was filtered off with suction, washed with ethanol and dried. Yield: 61 to 65 g. (85 to 91% of theory, referred to the cytidine-5'-phophoric acid morpholidate used).

EXAMPLE 2

Cytidine diphosphate ethanolamine 17.5 g. ethanolamine phosphate and 18 g. calcium chloride dihydrate were dissolved in 55 to 60 ml. distilled water, acidified with 4 to 5 ml. 34% hydrochoric acid and made up to 500 ml. with methanol. 24 g. cytidine-5'-phosphoric acid morpholidate in 300 ml. methanol were added to the above solution. After a few minutes, considerable precipitation occurred.

After about 3 to 4 hours, 300 ml. isopropanol were added dropwise, with gentle stirring, over a period of 6 to 7 hours. After a further 2 hours, the precipitate obtained was filtered off, dissolved in water, neutralized and chromatographed over a column containing 1 liter of an anion exchanger (Dower 1×2 in formate form; 50 to 100 mesh). After washing with water, the cytidine diphosphate ethanolamine formed was eluted with 0.02 M formic acid. The fractions containing the cytidine diphosphate ethanolamine were concentrated, neutralized with sodium hydroxide and crystallized by the addition of ethanol. The crystals obtained were filtered off with suction, washed with ethanol and dried. Yield: 18.6 to 21.5 g. (65 to 75% of theory, referred to the cytidine-5'-phosphoric acid morpholidate used).

EXAMPLE 3

Adenosine diphosphate galactose 14.5 g. calcium galactose-1-phosphate were suspended in 500 ml. methanol and just brought into solution by the addition of concentrated hydrochloric acid (pH about 2.5 to 3).

10 g. adenosine-5'-phosphoric acid morpholidate, dissolved in 200 ml. methanol were added to the galactose-1-phosphate solution until commencement of clouding, the remainder of this morpholidate solution then being slowly added dropwise, with stirring. 2 hours after completion of the morpholidate addition, the slow dropwise addition of 250 ml. isopropanol was commenced. After 10 hours, the precipitate obtained was filtered off, dissolved in water, neutralized and chromatographed over a column containing 500 ml. of an anion exchanger (Dowex 1 x 2 in formate form; 50–100 mesh). After washing with water, the column was eluted with 0.7 M sodium formate. The fractions containing the adenosine diphosphate galactose were combined and chromatographed over a column containing 2 liters of charcoal. After washing the charcoal column with water, the adenosine diphosphate galactose was eluted with isopropanol:water:sodium hydroxide (50:50:0.5). The eluates were combined, adjusted to pH 7.2 with sodium hydroxide solution, concentrated and the sodium salt of adenosine disphosphate galactose was precipitated with the tenfold volume of methanol. Yield: 6:5 to 7 g. (46 to 50% of theory, referred to adenosine-5'-phosphoric acid morpholidate used).

EXAMPLE 4

Uridine diphosphate glucose 15.3 g. calcium glucose-1-phosphate were suspended in 500 ml. methanol and just brought into solution by the addition of concentrated hydrochloric acid.

10 g. uridine-5'-phosphoric acid morpholidate, dissolved in 200 ml. methanol, were added to the calcium glucose-1-phosphate solution until commencement of clouding. The remainder of the morpholidate solution was slowly added dropwise, with stirring. The reaction mixture was further worked up in the manner described in Example 3 to give uridine diphosphate glucose. Yield: 8 to 9 g. (56 to 64% of theory, referred to uridine-5'-phosphoric acid morpholidate used).

EXAMPLE 5

Uridine disphosphate glucose 15.3 g. calcium glucose-1-phosphate and 10 g. uridine-5'-phosphoric acid morpholidate were dissolved in 100 ml. distilled water and acidified to pH 4.0 with 2 N hydrochloric acid. About 200 ml. methanol were added until commencement of clouding. After a few minutes, a marked flocculation started from this clouding. After a reaction time of 4 hours, 200 ml. isopropanol were added dropwise, with gentle stirring, within the course of 15 hours. The precipitate obtained was subsequently filtered off with suction, dissolved in water and, in the manner described in Example 3, was chromatographed and further worked up. Yield: 9 to 10 g. disodium uridine disphosphate glucose (62 to 70% of theory, referred to the uridine-5'-phosphoric acid morpholidate used).

EXAMPLE 6

Uridine diphosphate glucose 15.3 g. calcium glucose-1-phosphate and 10 g. uridine-5'-phosphoric acid piperidate were dissolved in 100 ml. distilled water and acidified, as described in Example 5, with hydrochloric acid and further worked up. There was obtained the same yield of disodium uridine disphosphate glucose as in Example 5.

In the same way, with the use of glucosamine phosphate and N-acetyl-glycosamine phosphate in the form of their calcium salts, there was prepared uridine diphosphate glucosamine and uridine diphosphate N-acetyl-glycosamine.

EXAMPLE 7

Adenosine diphosphate 4.2 ml. concentrated phosphoric acid were dissolved in 200 ml. methanol, neutralized with morpholine to pH 3.0 and warmed to 60° C. 13 g. adenosine-5'-phosphoric acid morpholidate, dissolved in 100 ml. methanol at 60° C., were added (the pH value increased somewhat due to the addition of this neutral morpholidate solution and during the reaction). The reaction mixture was left to stand for 24 hours at ambient temperature and thereafter concentrated to about 50 ml. by the removal of methanol, whereafter, in the manner described in Example 3, it was chromatographed over a column containing 600 ml. of an anion exchanger (Dowex 1X2) and worked up. Yield: 9 g. disodium adenosine diphosphate (about 50% of theory).

The designation $-PO_2^{-1}-$ in Formula I, above, is intended to indicate that one of the phosphorus-oxygen bonds is a co-ordinate covalent bond, i.e., the structure is

The designation $O_3P^{2-}$— in Formula II, above, is intended to indicate that two of the phosphorus-oxygen bonds are co-ordinate covalent bonds, i.e., the structure is

It will be understood that the specification and examples are illustrative but not limitative of the present invention and that other embodiments within the spirit and scope of the invention will suggest themselves to those skilled in the art.

What is claimed is:

1. Process for the preparation of nucleoside diphosphate and esters thereof which process comprises reacting
    (a) a nucleoside monophosphate amidate compound of the formula:

$$X—O—PO_2^{-1}—Am \qquad (I)$$

in which X is a nucleoside residue, and Am is a radical of the formula:

wherein $R_1$ and $R_2$, which can be the same or different, are hydrogen atoms or alkyl radicals containing up to 4 carbon atoms or wherein $R_1$ and $R_2$, together with the nitrogen atom to which they are attached, form a heterocyclic ring which can contain a further nitrogen atom or an oxygen atom;
    (b) a phosphoric acid compound of the formula:

$$O_3P^{2-}—O—R \qquad (II)$$

in which R is hydrogen or the residue of a hydroxyl group-containing organic compound and the phosphoric acid compound is sufficiently soluble in the solvent system to react with the amidate compound; in a solvent system comprising an aliphatic alcohol of from 1 to 4 carbon atoms or a dialkyl ketone of from 1 to 3 carbon atoms per alkyl group or dimethyl formamide at a pH of from about 1 to 6.5.

2. Process as claimed in claim 1 wherein the reaction is carried out at a pH of from about 4 to about 5.

3. Process as claimed in claim 1 wherein the reaction is carried out in methanol.

4. Process as claimed in claim 1 wherein the reaction is carried out in a methanol/isopropanol mixture.

5. Process as claimed in claim 1 wherein the pH value is adjusted by the addition of an inorganic or organic acid which is soluble in the solvent used and which does not react with or precipitate the reaction components.

6. Process as claimed in claim 5 wherein the acid used is a hydrohalic acid.

7. Process as claimed in claim 6 wherein the hydrohalic acid is hydrochloric acid.

8. Process as claimed in claim 1 wherein the reaction is carried out at a temperature between 0° C. and about 60° C.

9. Process as claimed in claim 1 wherein R and $R_1$ in Formula I are joined together to form a N-heterocycle containing from 5 to 6 ring atoms.

10. Process as claimed in claim 1 wherein the compound of Formula II is used in the form of an alkali metal or alkaline earth metal salt.

11. Process as claimed in claim 1 wherein the compound of Formula II is used in the form of a calcium salt.

12. Process as claimed in claim 1 wherein a sugar phosphate, amino alcohol phosphate or choline phosphate is used as compound of Formula II.

13. Process as claimed in claim 1 wherein the compound of Formula I is a morpholidate or piperidate.

14. Process as claimed in claim 1 wherein the compound of Formula I is used in the form of an alkali metal or alkaline earth metal salt.

15. Process as claimed in claim 1 wherein the compound of Formula I is used in the form of a calcium salt or in the form of a mixed calcium salt.

16. Process as claimed in claim 15 wherein the mixed calcium salt is a calcium halide mixed salt.

17. Process as claimed in claim 1 wherein water is present in or is added to the reaction mixture.

References Cited

UNITED STATES PATENTS

| | | | |
|---|---|---|---|
| 3,321,462 | 5/1967 | Moffatt | 260—211.5 R |
| 3,321,463 | 5/1967 | Moffatt | 260—211.5 R |
| 3,575,958 | 4/1971 | Nagasawa et al. | 260—211.5 R |

JOHNNIE R. BROWN, Primary Examiner

UNITED STATES PATENT OFFICE
CERTIFICATE OF CORRECTION

Patent No. 3,803,125　　　　　　　　　Dated April 9, 1974

Inventor(s) Hans Ulrich Bergmeyer et al

It is certified that error appears in the above-identified patent and that said Letters Patent are hereby corrected as shown below:

Col. 1, lines 66 et seq.

For "preparation of the corresponding"

read -- preparation of various nucleoside diphosphate esters by the reaction of the corresponding --

Signed and sealed this 1st day of October 1974.

(SEAL)
Attest:

McCOY M. GIBSON JR.
Attesting Officer

C. MARSHALL DANN
Commissioner of Patents